United States Patent [19]

Edel et al.

[11] Patent Number: 4,835,633

[45] Date of Patent: May 30, 1989

[54] DISK FILE DIGITAL SERVO CONTROL SYSTEM WITH COMPENSATION FOR VARIATION IN ACTUATOR ACCELERATION FACTOR

[75] Inventors: Stephen F. Edel; Michael L. Workman; Kenneth G. Yamamoto; Mantle M. H. Yu, all of San Jose, Calif.

[73] Assignee: International Business Machines Corporation, Armonk, N.Y.

[21] Appl. No.: 97,778

[22] Filed: Sep. 16, 1987

[51] Int. Cl.$^4$ .......................... G11B 21/08; G11B 5/55
[52] U.S. Cl. .............................. 360/78.12; 360/78.04; 318/561; 318/687
[58] Field of Search ..................... 360/77, 78; 318/561, 318/567, 569, 571, 590, 592, 594, 568, 600, 632, 615–617, 636, 687; 364/148–151, 167–170; 369/32, 33, 41, 43

[56] References Cited

U.S. PATENT DOCUMENTS 4,679,103  7/1987  Workman ............................ 360/77
4,697,127  9/1987  Stich et al. ......................... 318/561

OTHER PUBLICATIONS

*Digital Control of Dynamic Systems*, Franklin and Powell, Addison–Wesley Publishing Co. (1983) Chapter 6, pp. 131–139.

Primary Examiner—Alan Faber
Assistant Examiner—Steven R. Garland
Attorney, Agent, or Firm—Thomas R. Berthold

[57] ABSTRACT

A data recording disk file with a voice coil motor (VCM) actuator and a digital servo control system for positioning the read/write heads to selected concentric data tracks includes means for calculating the factor relating acceleration of the heads to VCM input current. This permits each disk file to compensate for any variation in the nominal VCM physical parameters, thus enabling VCMs to be manufactured to less demanding tolerances. The disk file also calculates a unique acceleration factor for each head position during movement of the heads from one track to another, thereby improving the arrival time of the heads to the target track. During an initialization procedure, the disk file performs a track seek, during which VCM current and head velocity information are acquired and used by the microprocessor in the digital servo control system to calculate a value representing an average actual acceleration factor unique to that disk file. This value, together with predetermined constants representing the characteristic relationship of acceleration factor to head position in a disk file with a nominal VCM, are used by the microprocessor to calculate the actual acceleration factor for each head position during a track seek.

7 Claims, 4 Drawing Sheets

DISK FILE DIGITAL SERVO CONTROL SYSTEM WITH COMPENSATION FOR VARIATION IN ACTUATOR ACCELERATION FACTOR

TECHNICAL FIELD

This invention relates to servo control systems for read/write head-positioning in data recording disk files of the type which use voice coil motor (VCM) actuators for positioning the head. More particularly, the invention relates to a digital servo control system which calculates the acceleration factor relating acceleration of the head to current applied to the VCM, and which uses this calculated acceleration factor as part of the computation of the control signal.

BACKGROUND OF THE INVENTION

Disk files are information storage devices which utilize a rotatable disk with concentric data tracks containing the information, a head for reading or writing data onto the various tracks, and an actuator connected by a support arm assembly to the head for moving the head to the desired track and maintaining it over the track centerline during read or write operations. The movement of the head to a desired track is referred to as track accessing or "seeking", while the maintaining of the head over the centerline of the desired track during a read or write operation is referred to as track "following".

The actuator is typically a "voice coil motor" (VCM) which comprises a coil movable through the magnetic field of a permanent magnetic stator. The application of current to the VCM causes the coil, and thus the attached head, to move radially. The acceleration of the coil is proportional to the applied current, so that ideally there is no current to the coil if the head is perfectly stationary over a desired track.

In disk files which have a relatively high density of data tracks on the disk, it is necessary to incorporate a servo control system to maintain the head precisely over the centerline of the desired track during read or write operations. This is accomplished by utilizing pre-recorded servo information either on a dedicated servo disk or on sectors angularly spaced and interspersed among the data on a data disk. The servo information sensed by the read/write head (or the dedicated servo head if a dedicated servo disk is used) is demodulated to generate a position error signal (PES) which is an indication of the position error of the head away from the nearest track centerline. The value of the PES is used by the servo control system to generate a control signal to the VCM to reposition the head over the track centerline during track following. Both the PES and a target track signal are used by the servo control system to generate a control signal to the VCM for moving the head from one track to another track during track seeking.

In order to determine the value of the control signal to the VCM, it is necessary to know the relationship between the current applied to the VCM and the acceleration of the movable coil to which the heads are attached. This relationship is given by the acceleration factor ($K_f/M$) which defines the acceleration of the coil per unit of input current. The term $K_f$ is the force factor which relates force applied to the coil per unit of input current, and M is the mass of the movable portion of the VCM (i.e. the coil, coil support and bearings) and attached head/arm assembly. The nominal value of $K_f$ for a specific disk file is determined from nominal values of magnetic flux density in the gap between the magnetic structure and the coil, the length of the coil turns exposed to the flux, the number of turns in the coil and the thickness of the wire forming the coil. Because each of these parameters has a tolerance about its nominal value, the actual value of $K_f$ for a specific VCM will have a tolerance about the nominal value. Similarly, the mass M will have a tolerance about some nominal value. Thus different VCMs of the same design will have different values of actual $K_f/M$. Since it is not feasible to design a unique servo control system for each VCM, with its unique value of $K_f/M$, prior art servo control systems have been designed around a constant nominal value of $K_f/M$.

In addition to variation in the nominal acceleration factor $K_f/M$ from disk file to disk file, the value of the force factor $K_f$ may also vary with the position of the movable coil in the VCM, which directly corresponds to head position. In prior art disk files, the servo control system cannot compensate for any variation in $K_f$ with head position. For this reason, an important consideration in the design of the VCM has been to make $K_f$ constant with head position. This has been accomplished by modifications to the VCM structure, such as tapering of the gap between the magnet structure and the coil, and removal of material from the center pole of the magnet structure.

A recent development in disk file servo control systems, as described in assignee's U.S. Pat. No. 4,679,103, is a digital servo control system, which, as part of the computation of the control signal to the actuator, makes use of a state estimator algorithm to estimate the position and velocity of the head. In this type of servo control system, a microprocessor receives, at discrete sample times, digital values corresponding to the PES and the actuator input current, and computes, through the use of the state estimator algorithm, a digital control signal. The digital control signal is then converted to an analog signal and amplified to provide a new actuator input current.

The method of estimating the state of the physical plant to be controlled in a digital control system requires the use of estimator "constants", the derivation of which is described in *Digital Control of Dynamic Systems,* Franklin and Powell, Addison-Wesley Publishing Co. (1983), chapter 6, pages 131–139. In the case of a disk file, these estimator constants are dependent upon the values of certain physical parameters of the disk file, such as the gain of the VCM power amplifier, the PES gain, the time between PES samples, the mass of the movable portion of the VCM and attached head/arm assembly, and the VCM force factor.

The estimator constants are generally referred to as "constants" because the values of the physical parameters from which they are determined are generally invariable. However, as just described, the acceleration factor is not constant, but varies from disk file to disk file, while the VCM force factor varies with head position in a specific disk file. Because the acceleration factor is required to determine the value of the VCM control signal in conventional disk files, as well as to determine the estimator constants in a disk file having the specific type of digital servo control system described in the '103 patent, the use of a constant nominal value of $K_f/M$ will result in an error in the value of the generated control signal. This control signal error will cause the head to undershoot or overshoot the target track when the head is moved between tracks, which will result in a unacceptable delay in the arrival of the head to the target track centerline, or in a seek error.

SUMMARY OF THE INVENTION

The present invention is a disk file having a digital servo control system which calculates the actual acceleration factor and uses this actual value during the computation of the control signal.

The disk file contains a memory storage device for storing a nominal acceleration factor $(K_f/M)_{NOM}$, which is equal to the average acceleration factor determined at the mid-band range of data tracks in a nominal disk file. The memory storage device also stores constants which are polynomial coefficients representing a polynomial curve fit for the nomimal acceleration factor as a function of head position. Following power on of the disk file, or during a subsequent re-zero initialization procedure, forward and reverse seeks are performed over the mid-band range of data tracks. During these seeks, head velocity and VCM current information is obtained and used to compute a measured acceleration factor $(K_f/M)_{MES}$ at the mid-band range of data tracks. The ratio $(K_f/M)_{MES}/(K_f/M)_{NOM}$ is then computed and stored. Thereafter whenever the disk file performs a seek, the actual $K_f/M$ is calculated from $K_f/M)_{MES}/(K_f/M)_{NOM}$, the stored polynomial coefficients, and the actual head position. During a seek, when the head position is rapidly changing, this calculation occurs during each cycle of the control signal algorithm so that the actual value of $K_f/M$ is used for each computation of the control signal.

By use of the actual $K_f/M$ in the control signal calculation, the arrival time of the head to the target track during a track seek is substantially improved. In addition, because variations in $K_f/M$ from disk file to disk file are automatically compensated by the digital servo control system, it is possible to manufacture VCMs to less precise tolerances, thereby reducing the manufacturing cost.

For a fuller understanding of the nature and advantages of the present invention, reference should be made to the following detailed description taken in conjunction with the accompanying drawings.

DESCRIPTION OF THE PREFERRED EMBODIMENTS

Figure 1:
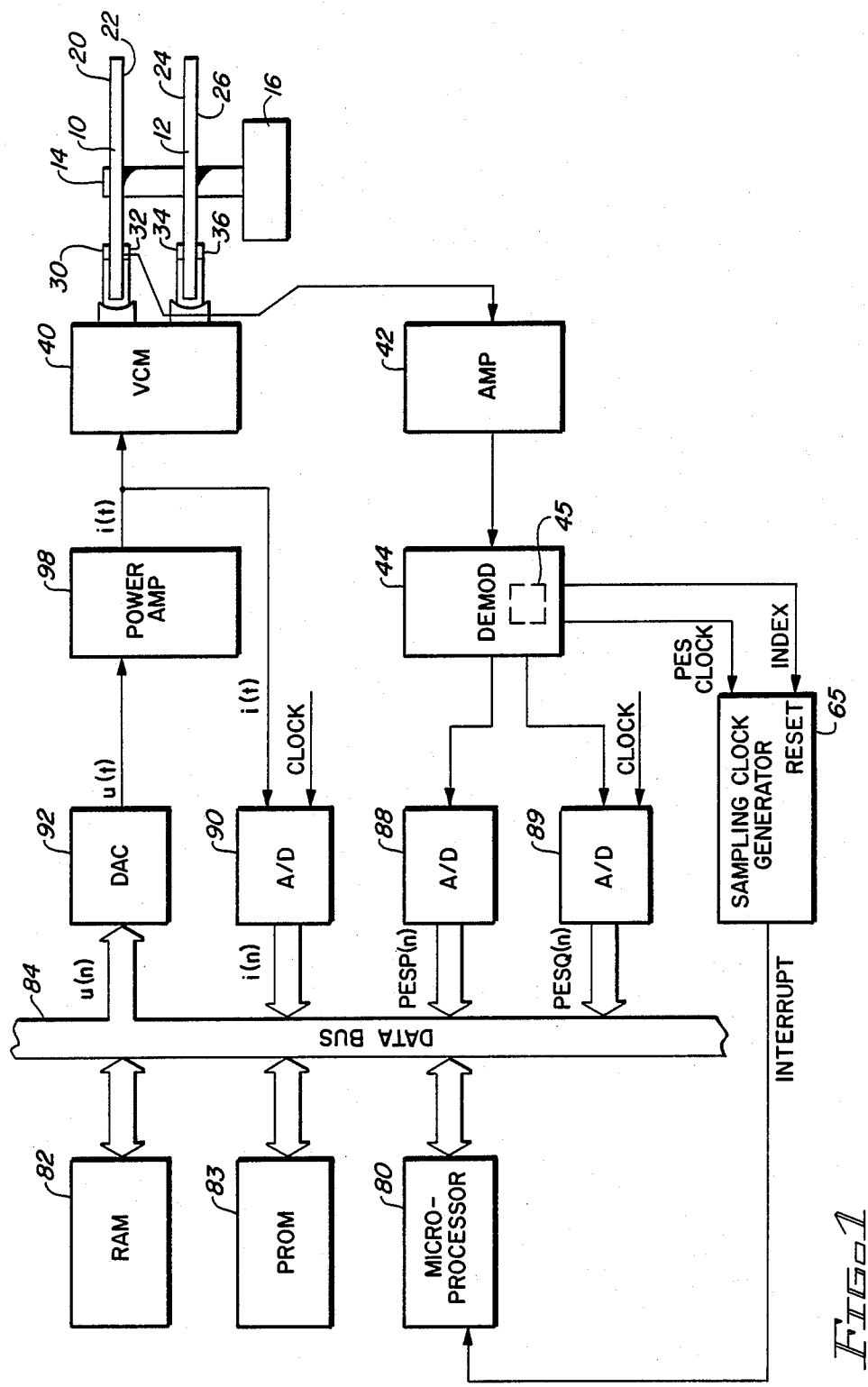
FIG. 1 is a block diagram of a digital servo control system with which the present invention may be utilized.

Referring first to FIG. 1, there is depicted a simplified block diagram of a digital servo control system with which the present invention is compatible. A pair of disks 10, 12 are supported on a spindle 14 of the disk file drive motor 16. Each of the disks 10, 12 has two surfaces 20, 22 and 24, 26, respectively. For purposes of this description, surface 20 on disk 10 and surfaces 24, 26 on disk 12 are data recording surfaces. Surface 22 on disk 10 is a dedicated servo surface and contains only prerecorded servo information. The servo information on disk 10 is recorded in concentric tracks, with the position information typically written in such a manner that the intersections of adjacent servo tracks on servo surface 22 are radially aligned with the centerlines of the data tracks on surfaces 20, 24, and 26.

The specific tracks on the data disks and the servo disk are accessed by heads 30, 32, 34, 36, each of which is associated with a respective disk surface and supported by an associated arm assembly. The heads 30, 32, 34, 36 are attached to a common accessing means or actuator, such as VCM 40. Thus the heads 30, 32, 34, 36 are all maintained in a fixed relationshp with one another relative to the radial position on their respective disk surfaces.

The signal read by servo head 32 is input to amplifier 42 and then demodulator 44. While the invention is operable with any of numerous types of servo patterns and servo signal demodulation techniques, the servo control system described herein utilizes a quadrature servo pattern, as described in the '103 patent and in *IBM Technical Disclosure Bulletin*, Vol. 21, No. 2 (July, 1978) pp. 804–805. The servo position information in the quadrature pattern on servo surface 22 is demodulated by demodulator 44 to generate two separate analog waveforms, designated primary (PESP) and quadrature (PESQ), as shown in FIG. 1. The analog PESP and PESQ signals from demodulator 44 are sent to analog-to-digital (A/D) converters 88, 89, respectively. The discrete values of PESP and PESQ at any sample time are designated PESP(n) and PESQ(n), where n represents a time index for each digital sample.

A microprocessor 80 is connected by data bus 84 and suitable address bus (not shown) to suitable memory devices, such as read/write memory (RAM) 82 and programmable read only memory (PROM) 83. Microprocessor 80 utilizes a control signal algorithm, as described in the '103 patent, to generate a control signal u(n). The control signal u(n) is output to digital-to-analog converter (DAC) 92 and amplified by power amplifier 98 to geerate an analog current i(t) to VCM 40. The analog current i(t) is fed back to analog-to-digital (A/C) converter 90, which provides a digital current signal i(n) to microprocessor 80. Microprocessor 80 thus receives as inputs, at discrete sample times, the digital actuator current i(n) and the digital head position error signals PESP(n) and PESQ(n). Microprocessor 80 computes the actual position error signal PES(n) from the values of PESP(n) and PESQ(n), using conventional logic, as described in the '103 patent.

As previously described, demodulator 44 demodulates the position information in the quadrature servo pattern to generate analog PESP and PESQ signals. Demodulator 44 also contains synchronization detection circuitry 45 which receives timing information from synchronization areas in the quadrature servo pattern and outputs a PES clock signal. The PES clock signal is output by synchronization detection circuitry 45 at a frequency corresponding to the rate at which the synchronization areas in the quadrature servo pattern pass beneath the servo head 32. The PES clock signal synchronization detection circuitry 45 is input to a sampling clock generator 65 which provides an interrupt signal to microprocessor 80. Sampling clock generator 65 may be a digital counter which divides the PES clock frequency by a fixed value to provide an interrupt signal to microprocessor 80 at a frequency substantially less than the PES clock input frequency. Each interrupt signal to microprocessor 80 initiates the beginning of the control signal algorithm, which results in the output of control signal u(n).

Figure 2:
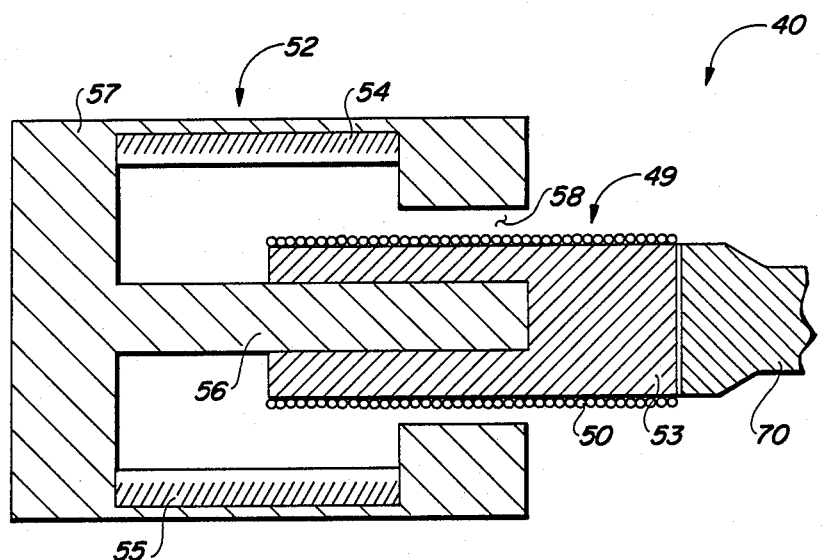
FIG. 2 is a schematic and partial sectional view of a typical disk file VCM.

Referring now to FIG. 2, there is illustrated a schematic representation of VCM 40. VCM 40 comprises generally a movable portion 49 and a magnet structure 52. Movable portion 49 of the VCM includes a coil 50 which is wound on a coil support 53 and a bearing assembly (not shown) which rides on fixed guide rails (not shown) so as to provide linear movement of the heads across the disk surfaces. The heads 30, 32, 34, 36 (FIG. 1) and their associated arm assembly 70 are attached to coil support 53. Magnet structure 52 includes permanent magnets 54, 55, a center pole 56, and an outer support 57 which provides a magnetic flux return path.

The coil is accelerated by a force generated when electrical current in the coil 50 occurs in the presence of magnetic flux in the gap 58 between the coil 50 and the magnet structure 52. The value of this force is given by the following relationship:

$$F = K_0 * \text{Sum}(L_j * I * B_j); \quad j = 1, N$$

where
$K_O$=proportionality constant (dependent on units)
$B_j$=flux density at j-th coil turn (tesla),
$L_j$=length of j-th coil turn exposed to flux (meters),
I=coil current (amps), and
N=number of turns in coil.

The VCM force factor is then given as follows:

$$K_f = F/I = K_0 * N * L * \text{Sum}(B_j). \quad j = 1, N$$

The acceleration factor is then $K_f/M$, where M is the mass of the movable portion 49 of VCM 40 and the attached head/arm assembly.

As previously described, the value of the acceleration factor $K_f/M$ must be known in order to accurately generate the control signal in disk files with conventional servo control systems, as well as in disk files with digital servo control systems which utilize a state estimator algorithm, such as that described in the '103 patent. In the case of conventional disk files, the acceleration factor must be known because it directly relates the acceleration of the head to the value of the control signal, as shown by the following relationship:

$$a(t) = K_f/M * i(t),$$

where
a(t)=acceleration of head,
i(t)=value of coil current resulting from control signal u(t), and
M=mass of movable portion of VCM and attached head/arm assembly.

In the case of a disk file with a state estimator algorithm forming a part of a digital servo control system, the acceleration factor is also important to compute an estimate of head position, velocity and acceleration.

The state estimator algorithm requires the use of estimator constants, which are defined below.
$p_{12} = K_x * T$,
$p_{13} = g_{31} = (K_f/M) * K_x * T^2/(2)$,
$p_{23} = g_{32} = (K_f/M) * T$,
$g_{11} = (K_f/M) * K_x * K_p * D * (T^2 + T * m + m^2)/(6)$
$g_{12} = (K_f/M) * K_p * D * (T+m)/(2)$,
$g_{21} = (K_f/M) * K_x * K_p * (m^3)/(6)$,
$g_{22} = (K_f/M) * K_p * (m^2)/(2)$,
where:
$K_f/M$=acceleration factor
$K_x$=PES gain,
$K_p$=power amplifier gain,
T=PES sampling time,
D=computation time delay between input of analog PES and output of digital control signal, and
m=T−D.

The $p_{ij}$, $g_{ij}$ terms are generally invariable since they are functions of physical parameters of the disk file which do not generally change. However, as indicated previously, the acceleration factor $(K_f/M)$ is not constant, but varies both with respect to a nominal value because of machine-to-machine variations in force factor $K_f$ and mass M, and with respect to head position because of variations in $K_f$ with head position. During track following, the performance of the servo control system will be less than optimal if the actual $K_f/M$ is different than the nominal $K_f/M$ to which the system was designed. During track seeking, if $K_f/M$ is maintained as a constant during the successive computations of the control signal, then the head velocity predicted by the state estimator will be higher or lower then the actual head velocity. The result will be an unacceptable undershoot or overshoot of the head to the target track, which significantly increases the access time of the actuator.

Figure 3:
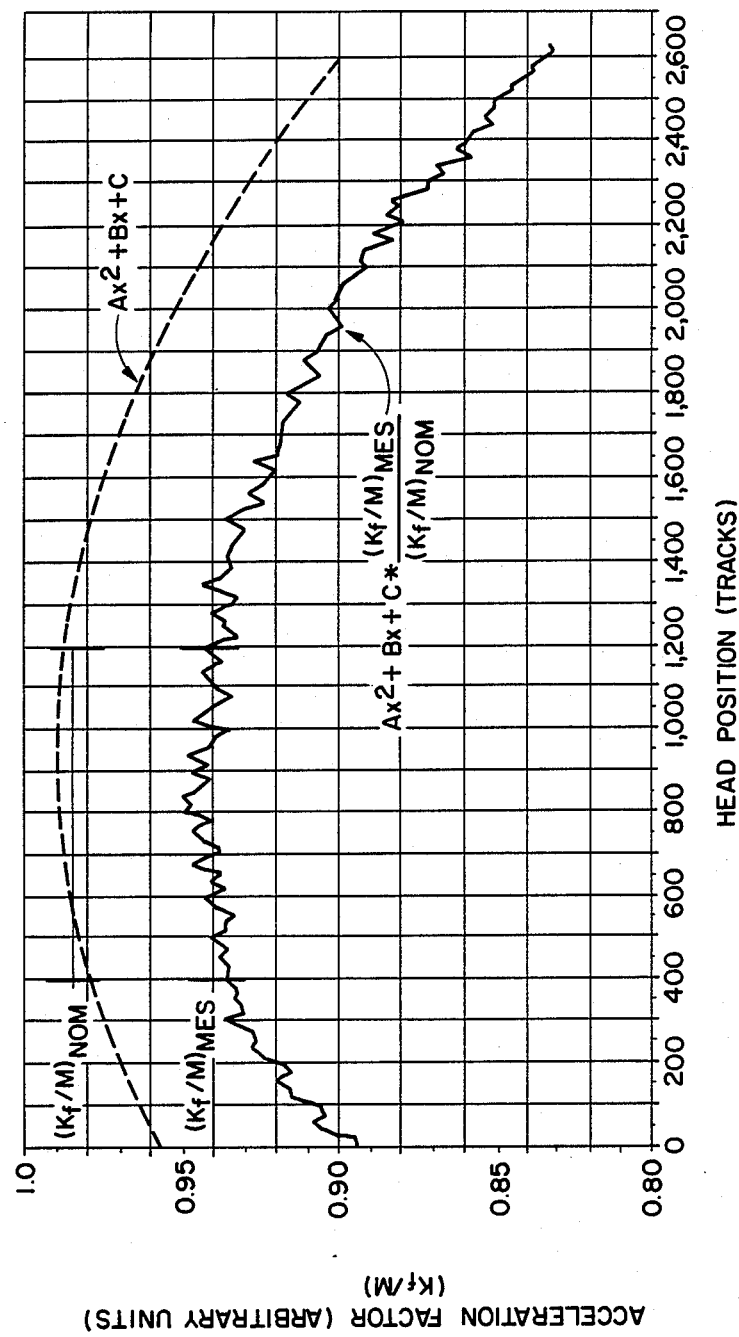
FIG. 3 is a representation of curves for the nominal force factor and the actual force factor as functions of the head position.

The manner in which the actual $K_f/M$ is calculated for a specific disk file will now be explained with reference to FIG. 3. The dashed line in FIG. 3 is a representation of the nominal acceleration factor as a function of head position, with position given in units of tracks. This relationship is determined experimentally by testing samples of disk files or by computation, based upon known values of the VCM parameters. The solid line in FIG. 3 is a representation of the actual acceleration factor as a function of head position for a specific disk file. The relationship of acceleration factor with head position has the same general shape for both the nominal VCM and the actual VCM. However, the two curves are displaced by an amount equal to the difference between the nominal acceleration factor and the actual acceleration factor. This difference is essentially a constant value, regardless of head position.

In the present invention, a nominal acceleration factor $(K_f/M)_{NOM}$ is selected to be the acceleration factor at approximately the mid-band of data tracks, which is a range over which there is minimal variation in force factor with head position. This value of the nominal acceleration factor is stored in PROM 83 and is the same value for all disk files. For example, as illustrated in FIG. 3 the value of $(K_f/M)_{NOM}$ stored in PROM 83 is the average nominal acceleration factor between tracks 400 and 1200, and is a value of approximately 0.985, in arbitrary units.

The computation for the measurement of the actual acceleration factor $(K_f/M)_{MES}$ occurs every time the disk file servo control system is initialized, which is referred to as a "re-zero". A re-zero occurs every time the disk file is first powered-on and at other times on selection by the user. As part of the re-zero process, a forward seek is performed between tracks 400 and 1200. During the seek, the value of VCM current, less that component due to bias forces, is summed for each control signal calculation and this sum is stored in RAM 82. (The equivalent current due to bias forces is referred to as "$w_e$" and is provided by the state estimator, in the manner described in the '103 patent.) At termination of the acceleration portion of the seek, the estimated velocity is also stored in RAM 82. The actual measured acceleration factor $(K_f/M)_{MES}$, which is the average acceleration factor between tracks 400 and 1200, is then given by the following relationship:

$$(K_f/M)_{MES} = \frac{v(Q)}{T_s * \text{Sum } i_s(k)},$$

$$k = 1, Q$$

where

Q = number of samples (computations) occurring during the acceleration portion of the seek,
v(Q) = velocity at Q-th sample,
$i_s(k)$ = actual VCM current, less the equivalent current due to bias forces, at k-th sample, and
$T_s$ = PES sampling time.

The term v(Q) is the terminal velocity and is equal to the integration of head acceleration over the time of the seek, where the units of integration are "samples," each sample being equal to the PES sampling time, $T_s$. Thus, $$v(Q) = T_s * \text{Sum } a(k)$$

$$k = 1, Q$$

But, $a(k) = (K_f/M) * i_s(k)$.

Since $T_s$ is constant and $K_f/M$ is assumed to be constant over the mid-band range of tracks, then $$v(Q) = (K_f/M) * T_s * \text{Sum } i_s(k),$$

$$k = 1, Q$$

which results in the above equation for $(K_f/M)_{MES}$. In the above-described technique, the term v(Q) is available from the state estimator during the Q-th sample. However, the actual velocity is also available in conventional disk fields which use an electronic or mechanical tachometer to measure head velocity.

In the preferred embodiment, a seek is also performed in the reverse direction and $(K_f/M)_{MES}$ is calculated. The two values are then averaged to generate the actual $(K_f/M)_{MES}$ which is used to compensate for the nominal $(K_f/M)_{NOM}$ stored in PROM 83.

The computed $(K_f/M)_{MES}$ is then used to arrive at the actual $K_f/M$ as a function of head position, x, in the following manner. As shown by the dashed line in FIG. 3, the relationship for the nominal force factor as a function of position can be given by the following polynomial:

$$(K_f/M)_{NOM}(x) = Ax^2 + Bx + C$$

This polynomial is a curve fit of actual measured data for a nominal VCM. After these measurements have been made for a nominal VCM, the polynomial coefficients A, B and C are stored in PROM 83. These coefficients are identical for each disk file. During a track seek, the actual $K_f/M$ for each head position is calculated from the polynomial coefficients, the head position x, and the ratio of measured to actual acceleration factor at the mid-band $(K_f/M)_{MES}/(K_f/M)_{NOM}$. It should be apparent from FIG. 3 that since the functions for the nominal acceleration factor (dashed line) and the actual acceleration factor (solid line) are the same shape, the two functions can be related merely by a change to the coefficient C. Thus, $$(K_f/M)(x) = Ax^2 + Bx + C *$$
$$(K_f/M)_{MES}/(K_f/M)_{NOM}.$$

The head position x is available to microprocessor 80 either as a result of the use of the state estimator algorithm, or from the demodulation of the PES to generate track crossing pulses, as is common in prior art disk files. During each cycle of the control signal computation, the values of A, B and C are recalled from PROM 83 and the term $(K_f/M)_{MES}/(K_f/M)_{NOM}$ recalled from RAM 82. Microprocessor 80 calculates $K_f/M$, which is used as part of the control signal calculation.

Figure 4:
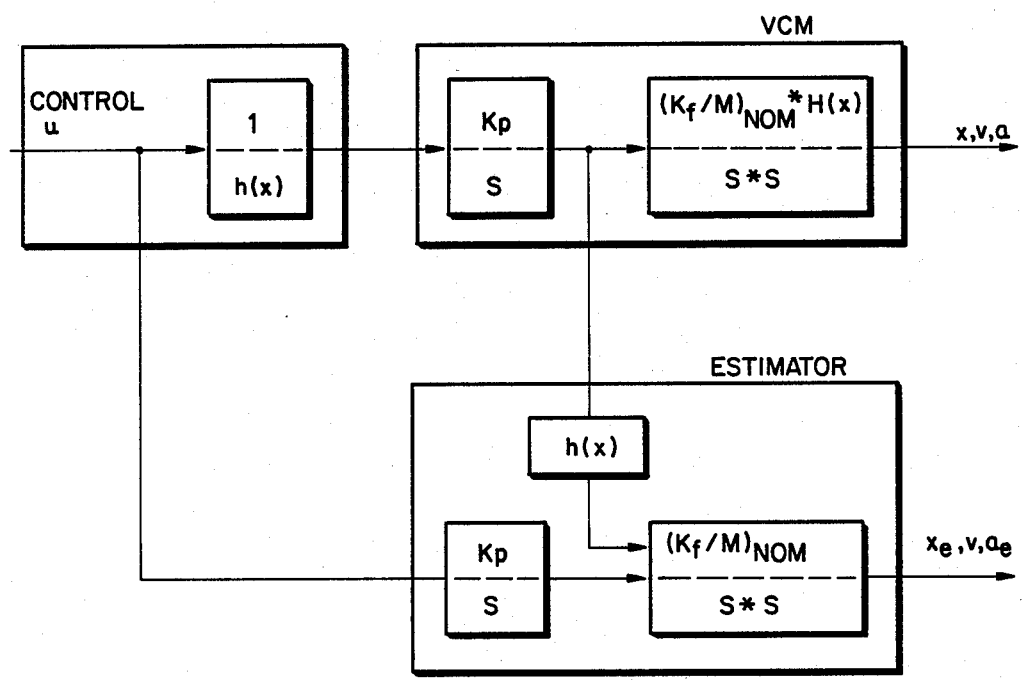
FIG. 4 is a block diagram, in Laplace transform format, representing the modification to the control signal in a digital servo control system having a state estimator.

The manner in which the control signal is modified in a digital servo control system with a state estimator is illustrated in FIG. 4. The H(x) block is $(K_f/M)(x)/(K_f/M)_{NOM}$ and represents the acceleration factor variations in the VCM under control. The h(x) block is also $(K_f/M)(x)/(K_f/M)_{NOM}$ and represents the modification to the control signal which will force the VCM inputs (head position "x", velocity "v", and acceleration "a") to the estimator to more closely represent the inputs from a nominal VCM. The unmodified control signal "u" is an input to the estimator. The h(x) block in the estimator operates on the output from the power amplifier to compensate for the h(x) modification to the control signal. Thus, in the preferred embodiment, the state estimator functions as a nominal state estimator, without any modifications to the estimator constants $g_{ij}$ and $p_{ij}$. This is possible because the control signal is modified with $h_{(x)}$ to force the VCM to behave as a nominal VCM with a fixed constant value of $k_f/M$. Alternatively, it is possible to modify the estimator constants $g_{ij}$ and $p_{ij}$ during each sample by computing them based on the actual $K_f/M$. This results in a modified control signal. However, this is not the preferred approach because modification of the estimator constants will change the transfer function of the system, and thus the performance of the VCM, from the nominal design.

Figure 5:
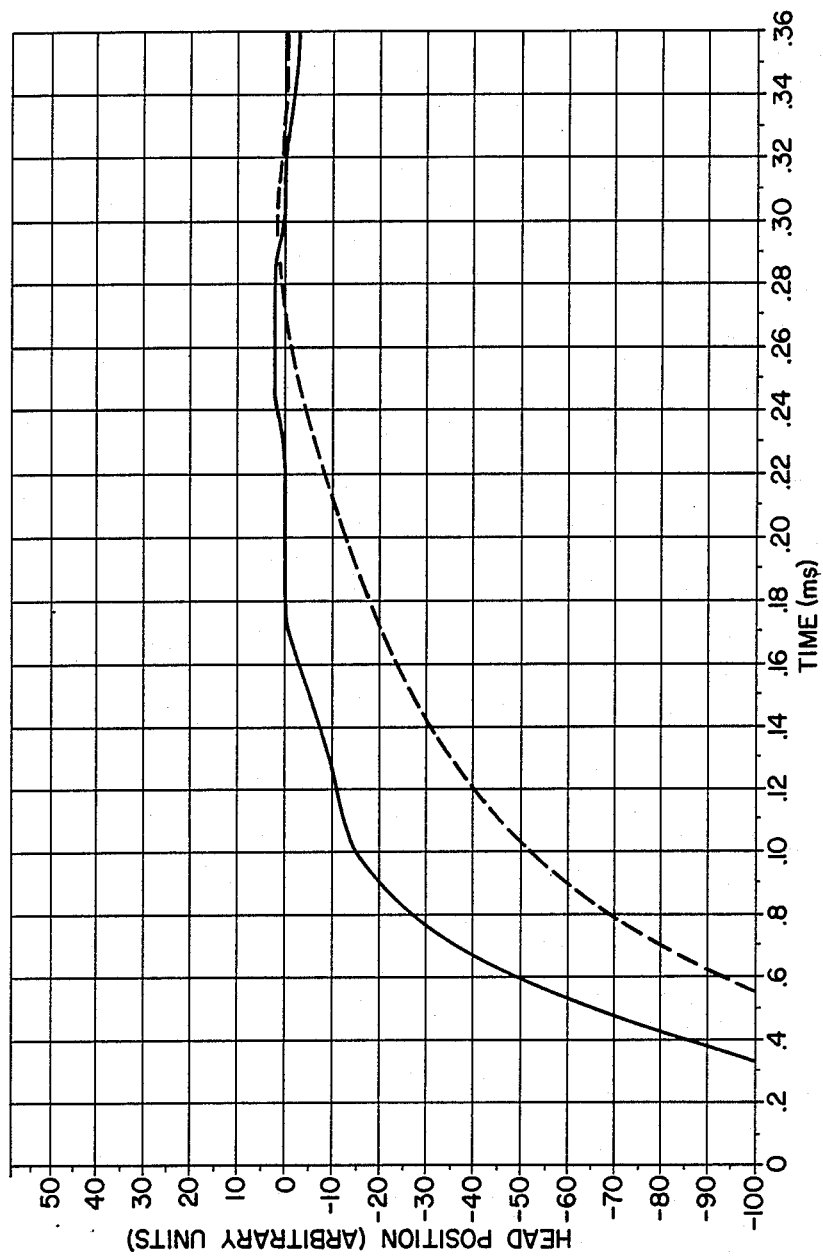
FIG. 5 is a comparison of the head arrival trajectories with and without the present invention in a disk file with a less than nominal $K_f/M$.

The improved performance of the servo control system is depicted in FIG. 5. The dashed line represents the arrival of the head to the target track for a full stroke seek for a disk file in which the actual $K_f/M$ is approximately 6% below the nominal $K_f/M$ and in which a constant nominal value of $K_f/M$ is used during the computation of the control signal. The solid line represents the arrival of the head to the target track for a full stroke seek for a disk file with a 6% low $K_f/M$ but in which the actual $K_f/M$ has been calculated in the above described manner for each cycle of the control signal algorithm during the full stroke seek. As shown in FIG. 5, with the use of the present invention, the head arrives to the centerline of the target track approximately 0.8 milliseconds earlier than it would have if a constant nominal value of $K_f/M$ were used in the computation of the control signal.

While in the preferred embodiment for representing the relationship of nominal $K_f/M$ as a function of x, only the polynomial coefficients A, B and C are stored, thereby minimizing the storage locations required in the disk file, it is within the scope of the present invention to provide a relatively large number of $K_f/M$ values for various head positions, such as in the form of a look-up table, in order to minimize the complexity of the $K_f/M$ calculation.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An improved data recording disk file of the type having at least one rotatable disk with generally concentric data tracks thereon, the data disk or a separate servo disk having servo information recorded thereon, at least one head for reading the servo information during rotation of the disk, a voice coil motor (VCM) actuator having a movable coil to which the head is attached for positioning the head relative to the data tracks in response to an input current, means for processing from the servo information a head position error signal (PES), and computing means for receiving, at discrete PES sample times, digital signals corresponding to digital values of the PES samples and for computing a digital control signal for use by the VCM, wherein the improvement comprises:

means for determining head velocity and coil current;
   means for storing values of head velocity, coil current and the time between discrete PES samples (the PES sampling time); and
   said computing means including means for calculating, from said stored values, a factor relating acceleration of the head to current input to the coil, wherein said calculated acceleration factor is used by said computing means to generate the digital control signal.

2. The improved disk file according to claim 1 wherein said calculating means includes means for averaging the values of at least two calculated acceleration factors.

3. The improved disk file according to claim 1 wherein said calculating means includes means for determining the acceleration factor for different head positions.

4. The improved disk file according to claim 3 wherein said acceleration factor determining means includes means for determining the acceleration factor at each PES sample time during movement of the head from one track to another track.

5. The improved disk file according to claim 1 wherein the disk file is of the type having an acceleration factor which is a predetermined polynomial function of the head position, and wherein said storing means includes means for storing values representing predetermined constant coefficients of said predetermined polynomial function, wherein said calculating means calculates the acceleration factor from the values of said coefficients and the value of head position.

6. An improved data recording disk file of the type having at least one rotatable disk with generally concentric data tracks thereon, the data disk or a separate servo disk having servo information recorded thereon, at least one head for reading the servo information during rotation of the disk, a voice coil motor (VCM) actuator attached to the head for positioning the head relative to the data tracks and having a characteristic acceleration factor for relating head acceleration to coil current, the acceleration factor being a predetermined polynomial function of head position, means for processing from the servo information a head position error signal (PES), and computing means for receiving, at discrete PES sample times, digital signals corresponding to digital values of the PES samples and the VCM input current and for computing a digital control signal for use by the VCM, said computing means including means for estimating the state of the VCM from, among other things, estimator constants, the estimator constants being determined by disk file physical parameters including the acceleration factor, wherein the improvement comprises:

means for storing values representing predetermined constant coefficients of said predetermined polynomial function; and
   wherein said computing means includes means for calculating the acceleration factor from the head position and said stored values of predetermined constant coefficients and for modifying the digital control signal in response to the calculated acceleration factor.

7. The improved disk file according to claim 6 wherein said means for modifying the digital control signal includes means for modifying the estimator constants from the calculated acceleration factor.

* * * * *